United States Patent
Kagawa (10) Patent No.: US 8,494,361 B2
(45) Date of Patent: Jul. 23, 2013

(54) APPARATUS FOR MONITORING OPTICAL SIGNAL QUALITY SPECIFICALLY APPLICABLE TO NRZ OPTICAL SIGNALS

(75) Inventor: Masatoshi Kagawa, Tokyo (JP)

(73) Assignee: Oki Electric Industry Co., Ltd, Tokyo (JP)

( * ) Notice: Subject to any disclaimer, the term of this patent is extended or adjusted under 35 U.S.C. 154(b) by 331 days.

(21) Appl. No.: 12/923,580

(22) Filed: Sep. 28, 2010

(65) Prior Publication Data

US 2011/0076011 A1 Mar. 31, 2011

(30) Foreign Application Priority Data

Sep. 28, 2009 (JP) ................................. 2009-222609

(51) Int. Cl.
*H04B 10/08* (2006.01)
*H04B 17/00* (2006.01)
(52) U.S. Cl.
USPC ............................................. 398/26; 398/25
(58) Field of Classification Search
USPC ..................................................... 398/26, 29
See application file for complete search history.

(56) References Cited

U.S. PATENT DOCUMENTS

| 6,493,088 | B1 * | 12/2002 | Hui et al. | 356/450 |
| 2009/0016712 | A1 | 1/2009 | Kagawa | |
| 2009/0297140 | A1 * | 12/2009 | Heismann et al. | 398/16 |
| 2010/0067904 | A1 * | 3/2010 | Brodsky et al. | 398/26 |

OTHER PUBLICATIONS

Z. Pan et al., "Chromatic dispersion monitoring and automated compensation for NRZ and RZ data usjng clock regeneration fading without adding signaling", Optical Fiber Communication Conference and Exhibit (OFC2001), WH5, (Mar. 2001).

* cited by examiner

*Primary Examiner* — Nathan Curs
(74) *Attorney, Agent, or Firm* — Rabin & Berdo, P.C.

(57) ABSTRACT

A binary intensity-modulated light signal to be monitored is split into three signal beams. The first and third beams are converted into electric signals. Frequencies of the first electric signal corresponding to a bit rate pass a filter bank. The intensity of the filtered signal is detected by an RF intensity detector. A delaying interferometer makes the second beam interfere with a light signal obtained by delaying the second beam by a predetermined delay time. One of the resulting interference signals is converted into an electric signal. The intensities of the amplified signal are detected by another RF intensity detector. The third electric signal is smoothed by the filter bank, and its average intensity is detected by a power detector. The intensities of the detected, amplified signals are found relative to the detected average intensity to determine wavelength dispersion and optical SNR or the tendency of their changes.

7 Claims, 11 Drawing Sheets

APPARATUS FOR MONITORING OPTICAL SIGNAL QUALITY SPECIFICALLY APPLICABLE TO NRZ OPTICAL SIGNALS

BACKGROUND OF THE INVENTION

1. Field of the Invention

The present invention relates to an apparatus for monitoring optical signal quality, and more particularly to such a quality monitoring apparatus applicable to NRZ (non-return-to-zero) optical signals.

2. Description of the Background Art

In order to estimate either the quality of an incoming transmission signal or the factor leading to its degradation, it is necessary to monitor the waveform of the signal. The waveform of an optical signal can be monitored using a sampling oscilloscope or other means. Generally, sampling oscilloscopes are complex and expensive instruments.

Such a problem is addressed by, for example, Z. Pan, et al., "Chromatic dispersion monitoring and automated compensation for NRZ and RZ data using clock regeneration fading without adding signaling", Optical Fiber Communication Conference and Exhibit (OFC2001), WH5, March 2001. In the solution disclosed by Z. Pan, et al., frequency components corresponding to the signal bit rate are detected, and the degree of degradation of the signal is detected from an increase or decrease in the intensity. Also, U.S. Patent Application Publication No. US 2009/0016712 A1 to Kagawa proposes a method of detecting a directly undetectable frequency, by modulating a monitored light signal with, for example, a sinusoidal wave obtained by adding an offset frequency to the quarter (¼) frequency and detecting the frequency of interest at the intensity of the output beat signal.

The prior art solution presented by Pan, et al., aims to measure wavelength dispersion on transmission paths. Signal degradation is caused not by dispersion alone but it is also necessary to take account of deterioration of optical signal-to-noise ratios (SNRs). In this respect, the quality monitor functions unsatisfactorily.

Figure 1A:
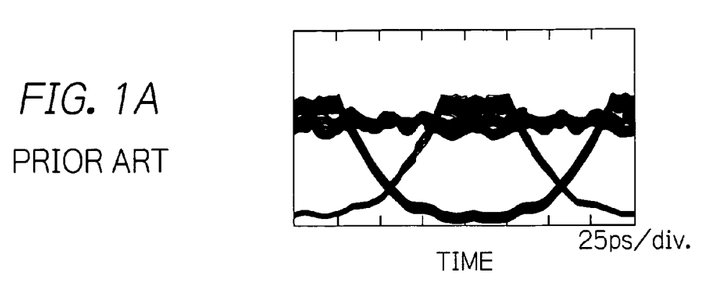
FIGS. 1A, 1B and 1C show temporal waveforms and frequency spectra for use in understanding the problems with the prior-art quality monitoring apparatus.
Figure 1B:
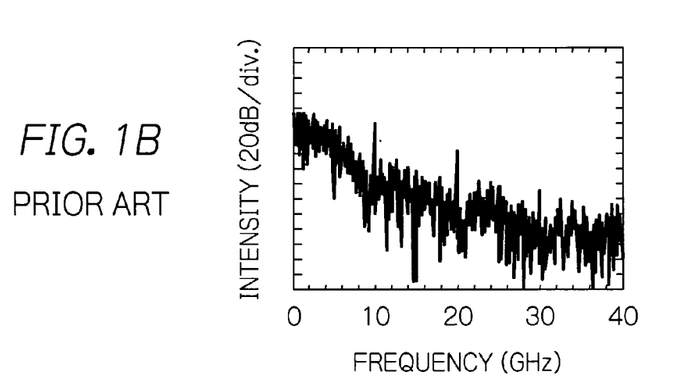
Figure 1C:
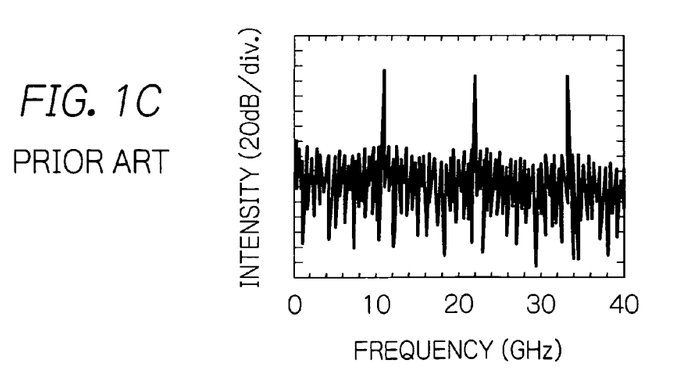

According to the prior art solution taught by Kagawa, frequency components of signals are decreased by deterioration of the optical SNRs and, therefore, if only the intensities of the frequency components are detected, it is then impossible to know the cause of degradation of the actually incoming transmission signal. Furthermore, Kagawa makes a mention of only deterioration of RZ (return-to-zero) signals. By contrast, with respect to NRZ (non-return-to-zero) signals, if the dispersion increases as shown in FIGS. 1A, 1B and 1C, the line spectrum of 10 GHz does not show a sufficient intensity as a bit rate frequency component compared with the level of the modulated signal. Therefore, if the prior art solution taught by Kagawa is applied to NRZ signals, the beat signals cannot be extracted.

FIG. 1A shows a temporal waveform obtained when the dispersion is 320 ps/nm. FIG. 1B shows a spectrum derived by converting an optical signal into an electric signal without modulation. FIG. 1C shows a spectrum obtained by converting an optical signal modulated at 10.25 GHz into an electric signal.

SUMMARY OF THE INVENTION

It is an object of the present invention to provide a quality monitoring apparatus which can detect plural kinds of quality at the same time and can monitor the quality of optical signals when they are NRZ optical signals.

In accordance with the present invention, a quality monitoring apparatus comprises: an optical splitter for splitting a binary intensity-modulated light signal to be monitored into three or more light signal beams; a delaying interferometer for making one of the light signal beams interfere with a light signal obtained by delaying the one light signal beam by a predetermined delay time to produce constructive and destructive interference signals to output one of the constructive and destructive interference signals; a photoelectric converter for converting the light signal beams directly supplied thereto from the optical splitter and a light signal emerging from the delaying interferometer into electric signals; a filter bank including a band-pass filter for passing a frequency component of an electric signal fed from the photoelectric converter, the frequency component corresponding to a bit rate of the light signal to be monitored, and a smoothing filter for smoothing an electric signal fed from the photoelectric converter; an amplifier for amplifying an output from the band-pass filter to a level enabling a subsequent detection; detector circuitry for detecting the intensity of an electric signal from the amplifier and the intensity of a smoothed electric signal; and an arithmetic circuit for setting the intensity of the detected, smoothed electric signal as a reference, and calculating the intensities of the detected, amplified signals relative to the reference to determine wavelength dispersion and optical SNR (signal-to-noise ratio) of the monitored light signal or a tendency of change in wavelength dispersion and optical SNR based on the calculated relative intensities. The detector circuitry comprises: a first signal intensity detector on a first branch line over which the light signal beam from the splitter passes for detecting the intensity of the band-pass filtered, amplified electric signal originated from the first signal beam; a second signal intensity detector on a second branch line over which the light signal beam from the splitter passes for detecting the intensity of the electric signal band-pass filtered and amplified after emerging from the delaying interferometer; and a power intensity detector on a third branch line over which the light signal beam from the splitter passes for detecting the intensity of the smoothed electric signal derived from the light signal.

Also in accordance with the present invention, a quality monitoring apparatus comprises: an optical splitter for splitting a binary intensity-modulated light signal to be monitored into three or more light signal beams; a delaying interferometer assembly for making plural ones of the light signal beams interfere with their respective light signals obtained by delaying the plural light signal beams by a predetermined delay time to produce constructive and destructive interference signals to output one of the constructive and destructive interference signals for each of the plural light signal beams; a prescaler operative in response to the plural light signal beams for down-converting frequency bands of the respective interference signals derived from the delaying interferometer assembly to produce beat signals; an oscillator for generating a signal of a predetermined frequency to the prescaler; a photoelectric converter for converting a light signal directly supplied from the optical splitter and the beat signals emerging from the prescaler into electric signals; a filter bank including a band-pass filter for passing a frequency component of the electric signal from the photoelectric converter, the frequency component corresponding to the bit rate of the light signal to be monitored, and a smoothing filter for smoothing another of the electric signals from the photoelectric converter; an amplifier for amplifying the output from the band-pass filter to a level enabling a subsequent detection; detector circuitry for detecting intensities of the electric signal from the amplifier and of the smoothed electric signal; and an arithmetic circuit for setting the intensity of the detected, smoothed electric signal as a reference, and calculating the intensity of each of the detected, amplified signals relative to the reference to determine wavelength dispersion and optical SNR of the light signal to be monitored or a tendency of change in wavelength dispersion and optical SNR based on the calculated relative intensities. The detector circuitry comprises: a first signal intensity detector provided on a first branch line over which the light signal beam from the splitter passes and responsive to first one of the interference signals from the delaying interferometer assembly for detecting the intensity of the band-pass filtered, amplified electric signal produced from the beat signal; a second signal intensity detector provided on a second branch line over which the light signal beam from the splitter passes and responsive to second one of the interference signals from the delaying interferometer assembly for detecting the intensity of the band-pass filtered, amplified electric signal produced from the beat signal; and a power intensity detector on a third branch line over which the light signal beam from the splitter passes for detecting the intensity of the smoothed electric signal derived from the light signal.

With the quality monitoring apparatus in accordance with the present invention, a binary intensity-modulated light signal to be monitored is split into three or more light signal beams by the optical splitter. One of the light signal beams from the splitter is made interfere by the delaying interferometer with a light signal obtained by delaying the one light signal beam by a predetermined delay time. One of the constructive and destructive interference signals is output. The light signals directly supplied from the optical splitter and the light signal from the delaying interferometer are converted into corresponding electric signals by the photoelectric converter. Frequency components of the electric signals from the photoelectric converter which correspond to the bit rate of the light signal to be monitored are passed through the band-pass filter of the filter bank. The signal from the interferometer is smoothed, averaged, and output. The outputs from the band-pass filters are amplified to a level at which detection in a subsequent stage is possible. The intensities of the electric signals from the amplifier and the intensity of the electric signal from the smoothing filter of the filter bank are detected by the detectors. The intensity of the smoothed electric signal detected by the arithmetic circuit is set as a reference. The intensities of the detected signals relative to the reference are calculated. Based on the calculated relative intensities, the wavelength dispersion and optical SNR of the optical signal to be monitored or the tendency of change in wavelength dispersion and optical SNR are determined. The detector has the first, second, and third branch lines over which the light signal beams from the splitter respectively pass. First one of the light signal beams passes through the first branch line of the detector that has the first signal intensity detector acting to detect the intensity of the band-pass filtered, amplified component of the electric signal derived from the first light signal beam. The second branch line of the detector includes the second signal intensity detector that detects the intensity of the band-pass filtered, amplified electric signal derived from the light signal from the delaying interferometer. The third branch line of the detector includes the power intensity detector that detects the intensity of the smoothed electric signal derived from the light signal. Consequently, NRZ light signals can be monitored effectively. Plural sorts of quality such as wavelength dispersion and optical SNR or alternatively the tendency of change in wavelength dispersion and optical SNR can be detected at the same time. Thus, the present invention can advantageously be applied to, for example, cases where wavelength dispersion and SNRs of optical signals in an optical transmission system are monitored.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 2:
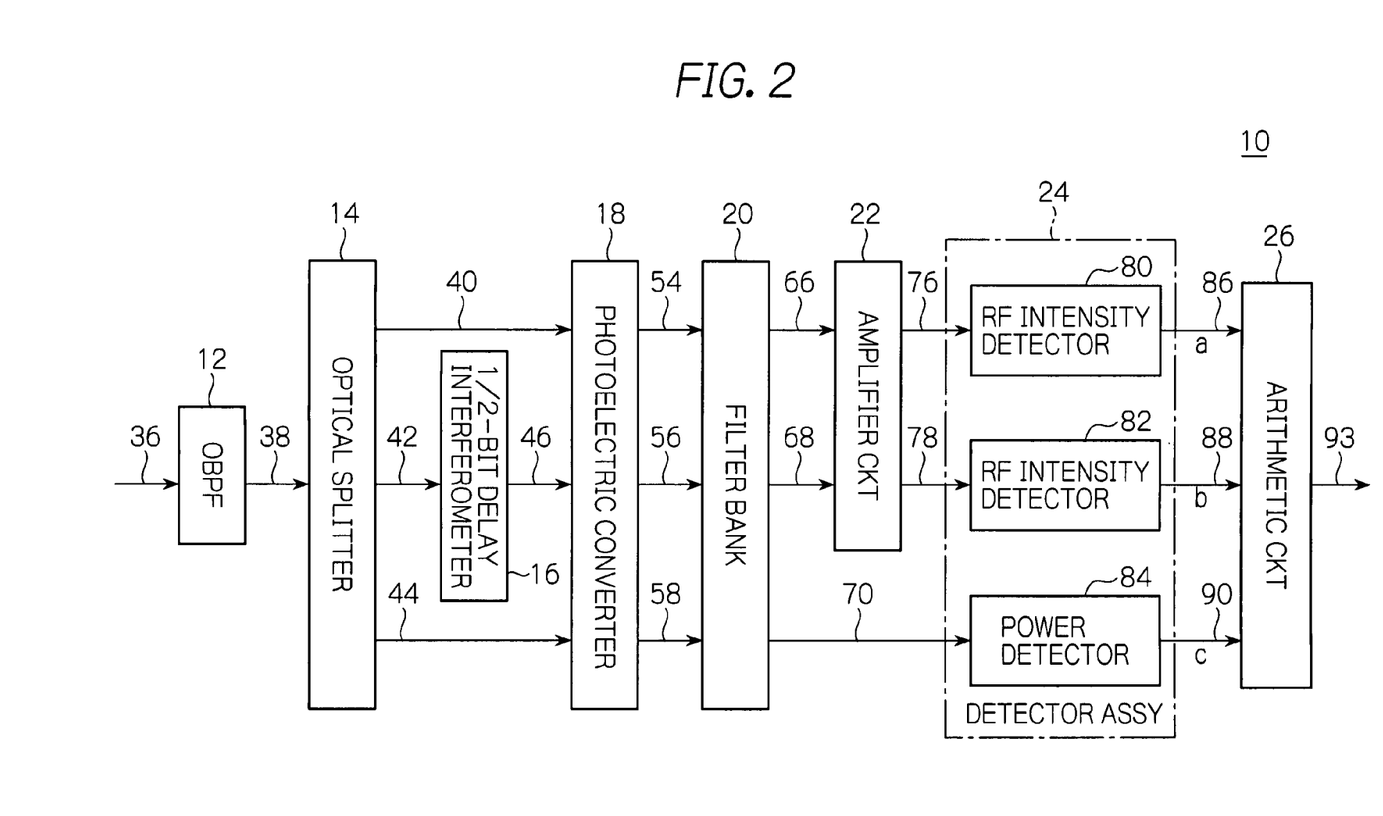
FIG. 2 is a schematic block diagram showing the configuration of an illustrative embodiment of a quality monitor in accordance with the present invention.

Preferred embodiments of the quality monitoring apparatus in accordance with the present invention will hereinafter be described in detail with reference to the accompanying drawings. FIG. 2 shows a quality monitor, generally 10, in accordance with a preferred embodiment of the invention. In the quality monitor 10, an optical splitter 14 splits a binary intensity-modulated light signal 38 to be monitored into three or more light signal beams 40, 42 and 44. The second light signal beam 42 is rendered by a ½-bit delay interferometer 16 interfere with a light signal obtained by delaying the second signal beam 42 by a predetermined delay time, one 46 of resulting constructive and destructive interference signals being output. The light signal beams 40 and 44 directly supplied from the optical splitter 14 and the light signal 46 from the ½-bit delay interferometer 16 are converted by a photoelectric converter 18 into corresponding electric signals 54, 56, and 58, respectively, which are band-pass filtered by a filter bank 20 as signals 66 and 68 of a frequency band corresponding to the bit rate of the light signal 38 to be monitored, and output as a signal 70 of smoothed, averaged components. The band-pass filtered output signals 66 and 68 are amplified by an amplifier circuit 22 to levels at which detection in a subsequent stage is possible. The intensities of the output electric signals 76 and 78 from the amplifier circuit 22 are detected by a detector assembly 24, giving rise to output signals 86 and 88, respectively. The intensity of the smoothed electric signal 70 is detected also by the detector assembly 24, resulting in an output electric signal 90. The intensity c of the electric signal 90 is set by an arithmetic circuit 26 as a reference, relative to which the intensities a and b of the signals 86 and 88, respectively, are calculated to determine the wavelength dispersion and optical SNR (signal-to-noise ratio) of the monitored light signal or the tendency of change in wavelength dispersion and optical SNR based on the calculated relative intensities. The band-pass filtered, amplified electric signal 76 derived from the light signal is detected by a signal intensity detector 80, producing the output signal 86 indicative of the intensity a as a first branch line, over which the light signal beam passes. The band-pass filtered, amplified electric signal 78 derived from the delaying interferometer is detected by another signal intensity detector 82, thus giving rise to the output signal 88 indicative of the intensity b as a second branch line, over which the light signal beam passes. The smoothed electric signal 70 arising from the light signal is detected by a power intensity detector 84, thus producing the output signal 90 indicative of the intensity c as a third branch line, over which the light signal beam passes. Thus, the quality monitor 10 can effectively monitor NRZ light signals. The monitor 10 is able to detect simultaneously plural kinds of quality such as wavelength dispersion and optical SNR or alternatively the tendency of change in wavelength dispersion and optical SNR.

Figure 10:
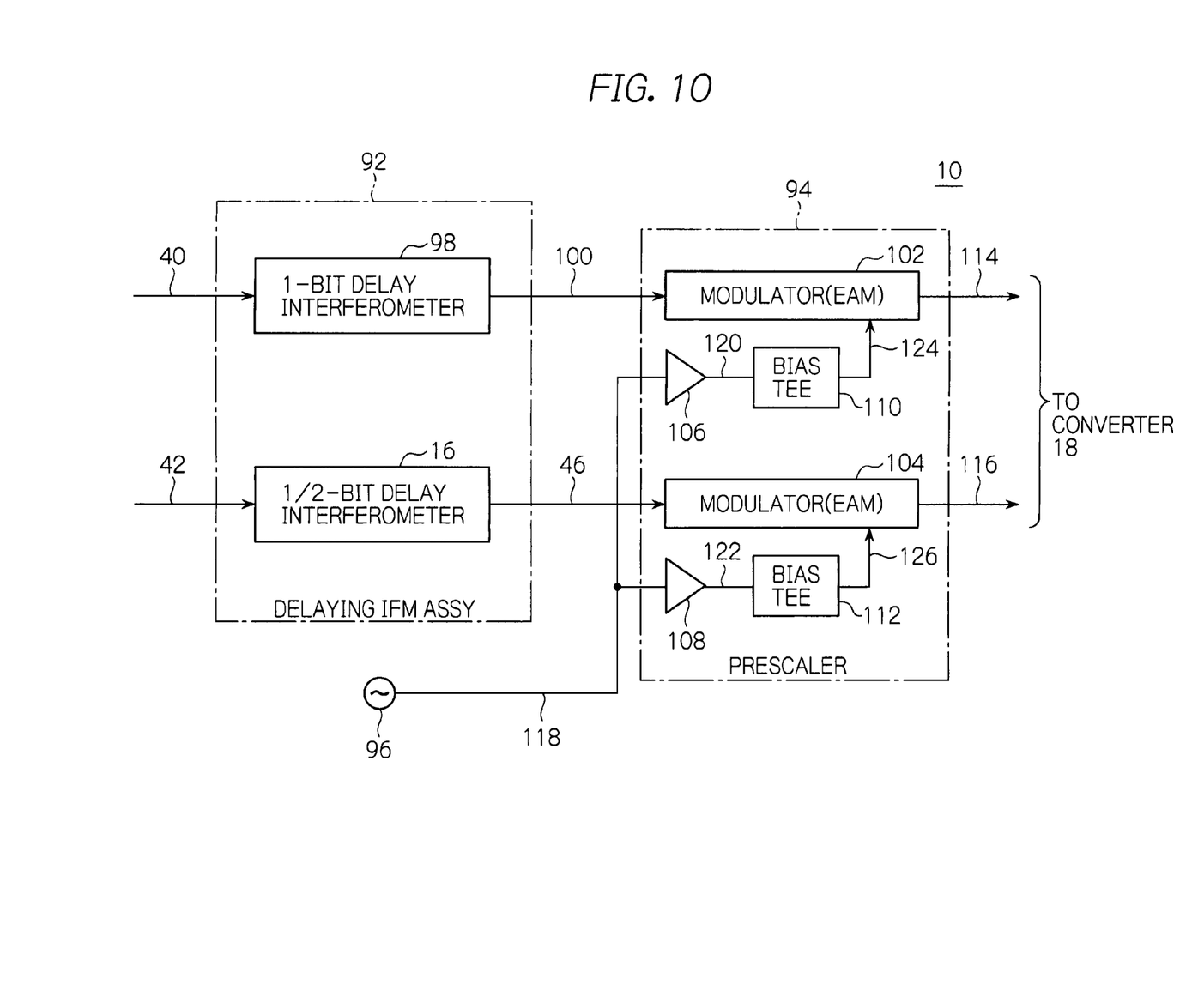
FIG. 10 is a schematic block diagram showing part of an alternative embodiment of a quality monitor in accordance with the present invention.

It is also possible to use only the second and third ones of the three branch lines of the above-described quality monitor without using the first branch line. This alternative configuration is shown in FIG. 10, where the plural light signal beams 40 and 42 are made interfere with their respective light signal beams delayed by a predetermined delay time by a delaying interferometer assembly 92 including two interferometers as described later. One of constructive and destructive interference signals is output from each of the two interferometers. The interferometer assembly 92 outputs interference signals 100 and 46 in response to the light signal beams 40 and 42, respectively. The frequencies of the interference signals 100 and 46 are down-converted by a prescaler 94, producing beat signals 114 and 116. Consequently, the frequency band used by the parts employed in stages subsequent to the photoelectric converter 18 can be made much lower than the frequency band of the light signal to be monitored. Hence, it is technically easy to fabricate this quality monitor. The parts costs can be suppressed. Plural kinds of signal or communication quality can be monitored at the same time.

Portions of the quality monitor 10 which are not directly relevant to understanding the present invention are neither shown nor described. In the following description, signals are indicated by reference numerals attached to connection lines on which they appear.

As shown in FIG. 2, the quality monitor 10 includes the optical band-pass filter (OBPF) 12, optical splitter 14, ½-bit delay interferometer 16, photoelectric converter 18, filter bank 20, amplifier circuit 22, detector assembly 24 and arithmetic circuit 26, which are interconnected as depicted.

Figure 3:
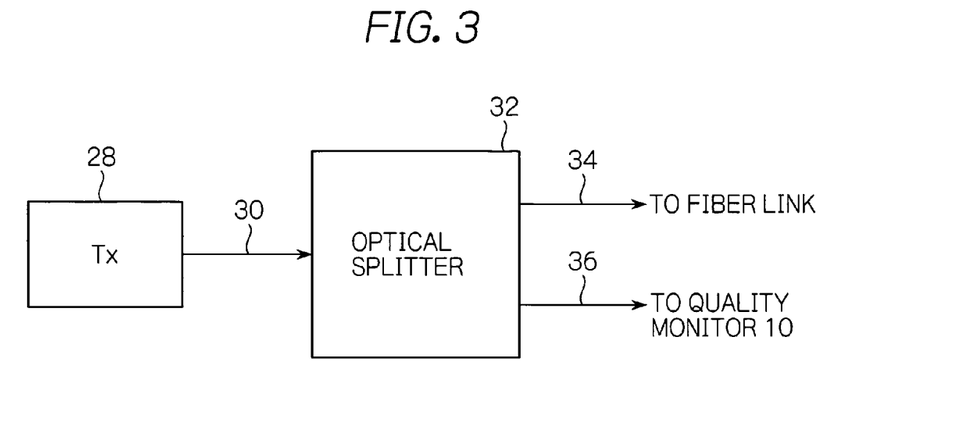
FIG. 3 is a schematic block diagram showing the connective relationship of a transmitter and an optical splitter to the quality monitor shown in FIG. 2.

As shown in FIG. 3, a light signal 30 output from a transmitter (Tx) 28 is supplied to an optical splitter 32. The light signal 30 may be an NRZ signal of, for example, 10 Gbit/s. The splitter 32 outputs light signal beams 34 and 36 to destinations, e.g. a fiber link and the quality monitor 10.

Referring back to FIG. 2, the optical band-pass filter (OBPF) 12 has a function of restricting frequencies to a band used to estimate the optical signal-to-noise ratio (SNR). The filter 12 outputs the band-limited light signal 38 to the optical splitter 14.

The optical splitter 14 has a function of splitting the supplied light signal into the plural signal beams. The optical splitter 14 of the present embodiment may be adapted to output the three light signal beams 40, 42, and 44 to the photoelectric converter 18 and ½-bit delay interferometer 16. In particular, as shown in FIG. 2, the signal beams 40 and 44 are supplied to the photoelectric converter 18, while the signal beam 42 is supplied to the interferometer 16.

The ½-bit delay interferometer 16 is adapted to generate one interference signal when the phase difference between the wavelengths corresponding to the carriers of two interfering light signals is equal to zero, and another interference signal when the phase difference is equal to π to output one of the generated interference signals. The former is a constructive interference signal, whereas the latter is a destructive interference signal. The ½-bit delay interferometer 16 of the present embodiment outputs the generated, constructive interference signal 46 to the photoelectric converter 18 with a delay corresponding to the period of half (½) bit.

Figure 4:
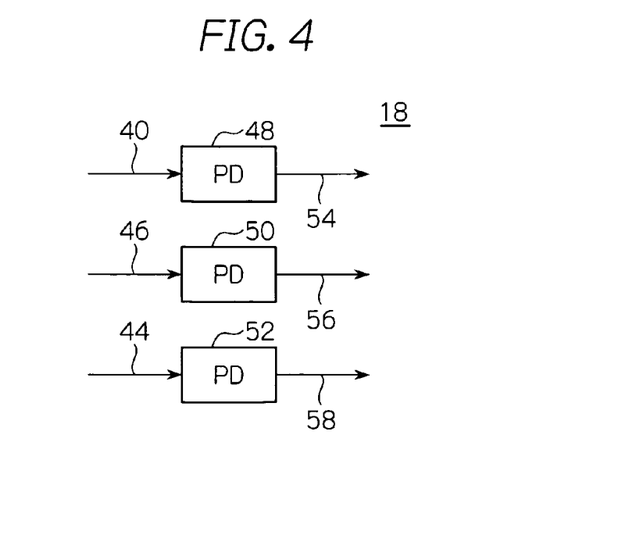
FIG. 4 is a schematic block diagram showing the configuration of a photoelectric converter shown in FIG. 2.

The photoelectric converter 18 has a function of converting the light signal beams supplied through their respective branch lines into corresponding electric signals. In the present embodiment, the photoelectric converter 18 has three photodiodes (PDs) 48, 50, and 52 corresponding to the three input light signal beams 40, 46, and 44, respectively, as shown in FIG. 4. The photodiodes 48, 50, and 52 output the electric signals 54, 56, and 58 to the filter bank 20 in response to the input light signal beams 40, 46, and 44, respectively.

Figure 5:
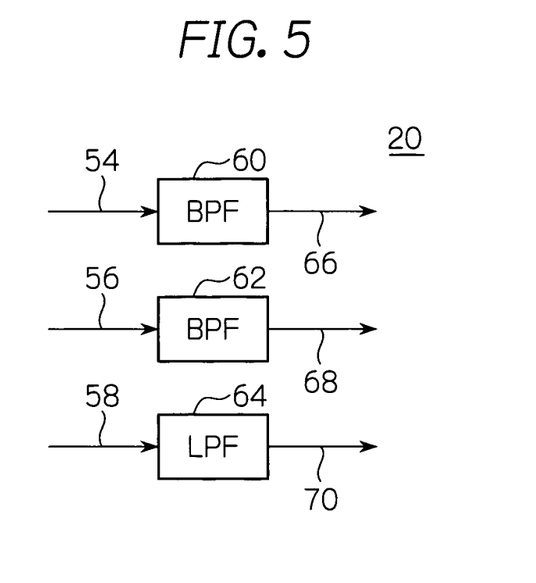
FIG. 5 is a schematic block diagram showing the configuration of a filter bank shown in FIG. 2.

The filter bank 20 has a function of passing only a predetermined band of frequencies of the electric signals supplied over their respective branch lines. In the present embodiment, as shown in FIG. 5, the filter bank 20 has two band-pass filters (BPFs) 60 and 62, and a low-pass filter (LPF) 64 corresponding to the three input electric signals 54, 56, and 58, respectively.

The band-pass filter 60 is adapted to extract the component of the bit rate frequency of the fundamental frequency component of the supplied signal 54, i.e. of 10 GHz. The filter 60 outputs the output signal 66 of the extracted component to the amplifier circuit 22. The band-pass filter 62 also is adapted to extract the component of 10 GHz from the supplied signal 56 and outputs the output signal 68 of the extracted component to the amplifier circuit 22. The low-pass filter 64 removes high-frequency components of the supplied signal 58 to thereby extract a beat signal component in a predetermined frequency band and smoothes the extracted beat signal component. The low-pass filter 64 outputs the smoothed output signal 70 to the detector assembly 24.

Figure 6:
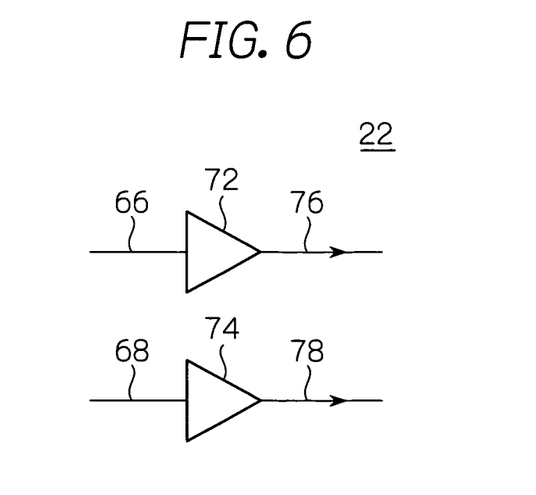
FIG. 6 is a schematic block diagram showing the configuration of an amplifier circuit shown in FIG. 2.

The amplifier circuit 22 has a function of amplifying the level of the supplied signal in conformity with the signal-detecting capability of the later stage. In the present embodiment, as shown in FIG. 6, the amplifier circuit 22 has amplifiers 72 and 74 which amplify the supplied, extracted signals 66 and 68, respectively, and deliver the amplified signals as the signals 76 and 78 to the detector assembly 24.

The detector assembly 24 has a function of detecting the intensities of the supplied signals. In the present embodiment, the detector assembly 24 has the radio-frequency (RF) intensity detectors 80 and 82, and the power detector 84 as shown in FIG. 2. The RF intensity detectors 80 and 82 are adapted to detect the intensities of the supplied RF signals 76 and 78, respectively, and output the output signals 86 and 88 indicating the detected intensities a and b, respectively, to the arithmetic circuit 26. The power detector 84 is adapted for detecting the intensity of the smoothed, averaged signal 70 to output the output signal 90 indicative of the detected intensity c to the arithmetic circuit 26.

Figure 7:
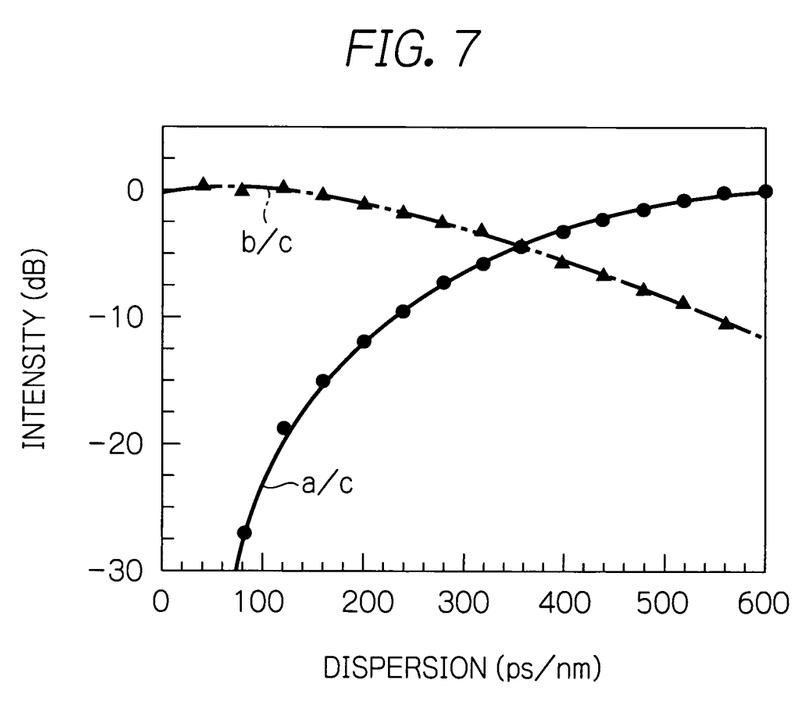
FIG. 7 is a graph in which intensity values calculated by the arithmetic circuit shown in FIG. 2 are plotted with respect to wavelength dispersion.

The arithmetic circuit 26 has a function of performing arithmetic operations using the intensity values of the supplied signals, and determining the tendency of change in wavelength dispersion and optical SNR based on the results of the arithmetic operations. In the arithmetic circuit 26, the range of values that the optical SNR can be dealt with subranges, and the arithmetic circuit 26 also has a function of storing data about the contents of a found graph, making a search, and determining the optical SNR and wavelength dispersion in each of the sub-ranges. The signals 86, 88, and 90 indicative of the intensities a, b, and c, respectively, are supplied to the arithmetic circuit 26. In the present embodiment, the value of the signal passing one of the three branch lines, i.e. the value c of the power intensity, is treated as fundamental information. The arithmetic circuit 26 calculates the ratios a/c and b/c of the two intensities a and b to the intensity c, respectively. The ratios a/c and b/c computed by the arithmetic circuit 26 vary with wavelength dispersion as shown in FIG. 7.

When the optical SNR of a light signal decreases, the signal component in the input light signal decreases. Therefore, the ratios a/c and b/c computed by the arithmetic circuit 26 become smaller than the values of ratios a/c and b/c computed when the signal component of the light signal did not yet decrease.

The arithmetic circuit 26 has data stored in advance which describe the contents of the found graph shown in FIG. 3 for each sub-range of the range of values that the optical SNR can assume. The arithmetic circuit 26 uses the pair of ratios a/c and b/c computed by the arithmetic circuit 26 as a searching key to search the stored data to thereby determine the optical SNR and wavelength dispersion.

The arithmetic circuit 26 may be adapted to find, at a predetermined time interval, the tendency of change of the pair of ratios a/c and b/c compared with the pair of ratios a/c and b/c obtained the previous time to determine the tendency of change in wavelength dispersion or optical SNR.

Furthermore, the arithmetic circuit 26 may be adapted to calculate other values for use in the quality monitor. For instance, values $a^2/c$ and $b^2/c$ may be used. In addition, the arithmetic circuit 26 may be adapted to use values a−c and b−c in performing calculations. Further, the arithmetic circuit 26 may be adapted to use the values (a−c)/c and (b−c)/c in performing calculations.

The arithmetic circuit 26 may be adapted to compare the calculated values with a threshold value. If the threshold value is not reached, the arithmetic circuit 26 may output information signal 93 indicating quality deterioration.

In operation, the quality monitor 10 supplies the light signal beam 36 to the optical band-pass filter 12, which in turn outputs the band-limited light signal 38 to the optical splitter 14. The splitter 14 splits the signal into the three signal beams 40, 42, and 44 and outputs them.

The light signal beam 40 passing the first branch line is converted into the corresponding electric signal 54 by the photodiode 48 shown in FIG. 4. The electric signal 54 is fed to the band-pass filter 60 shown in FIG. 5. The filter 60 extracts components of 10 GHz from the electric signal 54. The output signal 66 from the filter 60 is supplied to the amplifier 72, where the signal is amplified in conformity with the detecting capability of the RF intensity detector 80. The RF output signal 76 from the amplifier 72 is furnished to the RF intensity detector 80, which in turn detects the intensity of the RF signal 76 and outputs the signal 86 indicative of the detected intensity a to the arithmetic circuit 26.

The light signal beam 42 passing the second branch line is applied to the ½-bit delay interferometer 16. The interferometer 16 causes the input NRZ-modulated light signal beam 42 to interfere with a light signal obtained by delaying the input light signal beam 42 by a period substantially corresponding to the period of ½ bit.

In the present embodiment, the ½-bit delay interferometer 16 has output ports for delivering the constructive and destructive interference signals, respectively. The constructive interference signal is produced when the phase difference between the wavelengths corresponding to the carrier waves of the two light signals made interfere is equal to zero. The destructive interference signal is produced when the phase difference is equal to π. The interference signal from the former output port is used.

The light signal 46 delivered from the ½-bit delay interferometer 16 is converted into the corresponding electric signal 56 by the photodiode 50. The signal 56 is applied to the band-pass filter 62, which in turn extracts the component of 10 GHz from the input electric signal 56. The output signal 68 from the filter 62 is amplified by the amplifier 74 in conformity of the detecting capability of the RF intensity detector 82. The output RF signal 78 from the amplifier 74 is fed to the RF intensity detector 82. The detector 82 detects the intensity of the RF signal 78 and outputs the output signal 88 indicative of the detected intensity b to the arithmetic circuit 26.

The light signal beam 44 passing over the third branch line is converted into the corresponding electric signal 58 by the photodiode 52 shown in FIG. 4, the signal 58 being applied to the low-pass filter 64 shown in FIG. 5. The low-pass filter 64 removes high-frequency components from the electric signal 58, thus smoothing or averaging the signal 58. The smoothed output signal 70 from the low-pass filter 64 is output to the power intensity detector 84. The detector 84 detects the intensity of the smoothed signal 70 as an average power and outputs the output signal 90 indicative of the detected intensity c to the arithmetic circuit 26.

The arithmetic circuit 26 first calculates the ratios a/c and b/c from the three input intensities a, b, and c indicated by the signals 86, 88, and 90, respectively. The arithmetic circuit 26 determines the values of the wavelength dispersion and optical SNR or the tendency of change in wavelength dispersion and optical SNR based on the calculated ratios a/c and b/c.

Figure 8:
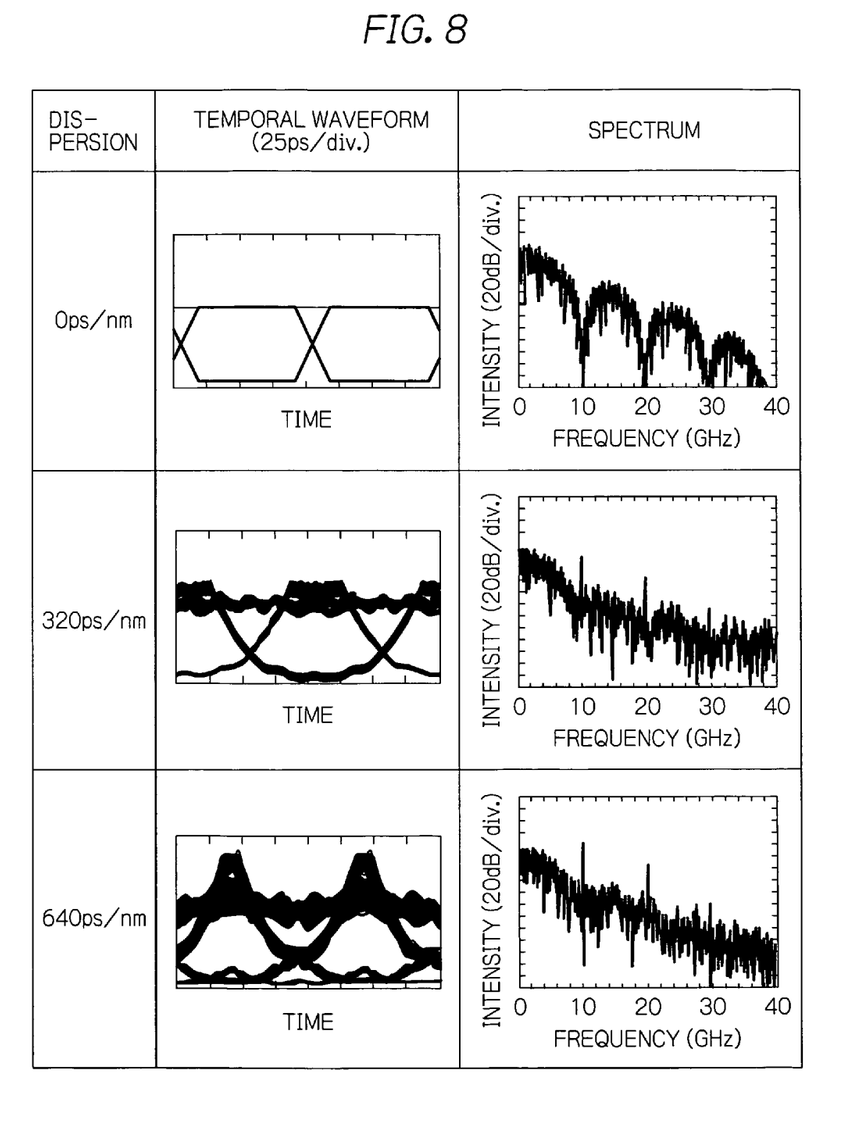
FIG. 8 shows characteristics, such as temporal waveforms and spectra, of electric signals output from the first photodiode at some levels of wavelength dispersion in the quality monitor of FIG. 2.

The light signals not yet photoelectrically converted have respective wavelength dispersion values of 0, 320, and 640 ps/nm. Temporal waveforms and spectra of the electric signal 54 photoelectrically converted by the photodiode 48 on the first branch line from the light signals are shown in FIG. 8. As is obvious from FIG. 8, as the amount of wavelength dispersion increases, the intensity of 10 GHz increases in a spike-like manner. This is equivalent to the fact that as the amount of wavelength dispersion increases, the computed ratio a/c increases.

Figure 9:
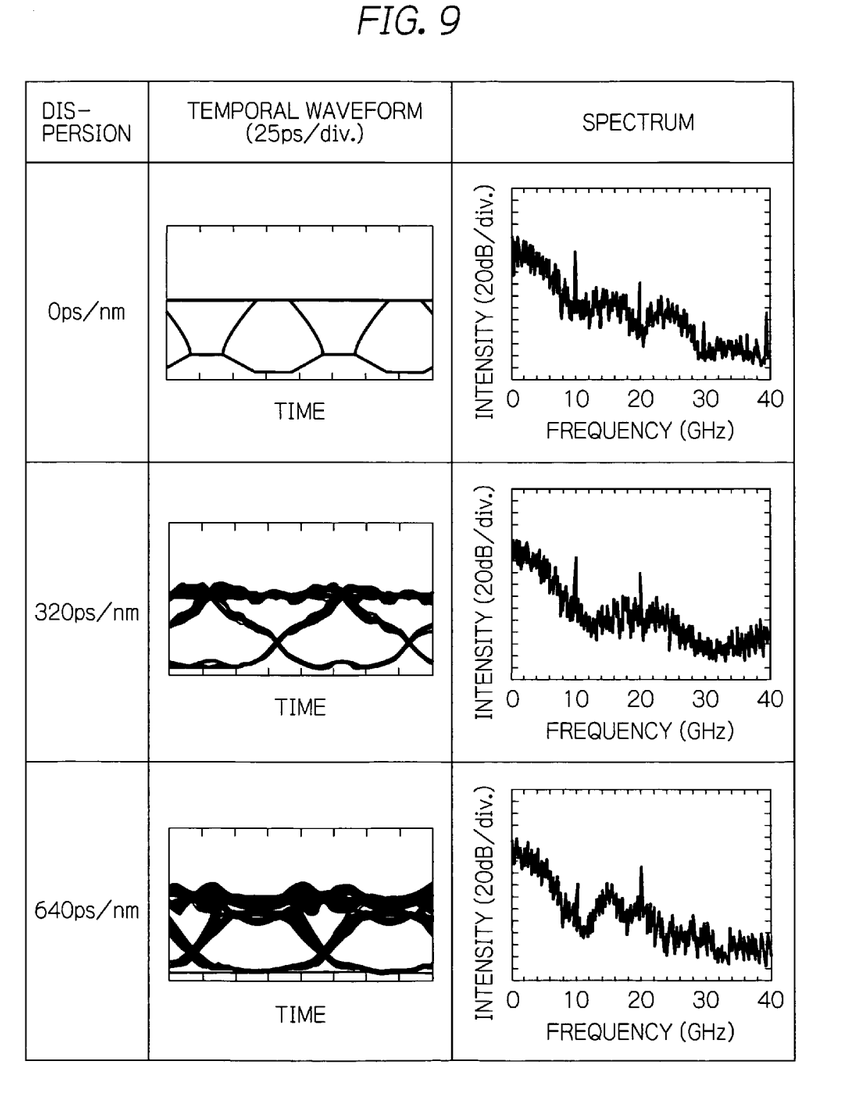
FIG. 9 shows characteristics, such as temporal waveforms and spectra, of electric signals output from the second photodiode at some levels of wavelength dispersion in the quality monitor of FIG. 2.

The light signals, before photoelectrically converted, have respective wavelength dispersion values of 0, 320, and 640 ps/nm. Temporal waveforms and spectra of the electric signal 56 photoelectrically converted by the photodiode 50 on the second branch line from the light signals are shown in FIG. 9. On the second branch line, as the amount of wavelength dispersion increases, the intensity of 10 GHz decreases. This is equivalent to the fact that as the amount of wavelength dispersion increases, the computed ratio b/c decreases.

When the optical SNR of a light signal decreases, the signal component of the input light signal decreases. Thence, the computed ratios a/c and b/c become smaller than the computed ratios a/c and b/c indicating the state in which the signal component of the light signal is not yet reduced.

The arithmetic circuit 26 has data stored which describe the contents of the graph as plotted in FIG. 7 and are found in advance for the sub-ranges of the range of values that the optical SNR can assume. The arithmetic circuit 26 uses the pair of ratio a/c and b/c computed by the arithmetic circuit 26 as a search key to search the data to thereby determine the pertinent optical SNR and wavelength dispersion.

The arithmetic circuit 26 may not be limited to one performing this specific way of determination. Other methods of determination may also be used. The arithmetic circuit 26 may be adapted to calculate, at predetermined time intervals, the ratios a/c and b/c, compare the pair of obtained ratios a/c and b/c with the pair of ratios a/c and b/c calculated the previous time, determine the tendency of the quality of the optical signal to be inspected, and fix the tendency of change in wavelength dispersion or optical SNR. For example, if the calculated ratios a/c and b/c have decreased, it is determined that the optical SNR has deteriorated. If both calculated ratios a/c and b/c have increased, it is determined that the optical SNR has improved.

Furthermore, if the calculated ratio a/c has increased but the calculated ratio b/c has decreased, it is then determined that the wavelength dispersion has increased. Conversely, if the calculated ratio a/c has decreased but the calculated ratio b/c has increased, it is then determined that the wavelength dispersion has decreased. Furthermore, if the calculated ratios a/c and b/c are close in value to the previously obtained ratios, it is then determined that the wavelength dispersion and optical SNR have varied little.

As described so far, according to the present embodiment, the wavelength dispersion and optical SNR of an NRZ light signal can be evaluated at the same time.

Now, an alternative embodiment of the quality monitor 10 in accordance with the present invention will be described with reference to FIG. 10. In the specification and accompanying drawings, like components are indicated with the same reference numerals, and may not repetitively be described. The quality monitor 10 of the instant alternative embodiment may be the same as the illustrative embodiment shown in and described with reference to FIG. 2 in that both have three branch lines. However, the instant alternative embodiment may be different from the previous embodiment in that the former lacks a signal line corresponding to the first branch line of the previous embodiment. In the alternative embodiment, the light signal 38 to be monitored is split into the three signal beams 40, 42, and 44 by the optical splitter 14 in the same way as in the previous embodiment.

However, the optical splitter 14 takes the two 40 and 42 of the three signal beams 40, 42, and 44 as first and second signal beams and supplies them to the delaying interferometer assembly 92. The interferometer assembly 92 outputs two processed signals corresponding to the second signal beam in the previous embodiment. Accordingly, the alternative embodiment may be featured in that processing of the first signal beam performed in the previous embodiment does not take place and that there are two delayed output signals made interfere. This means that, if a modulator that down-converts the frequency band of a zero-dispersion light signal is mounted on the first branch line of the previous embodiment, a sufficient light signal of lowered frequencies could not be obtained because the line spectral intensity of 10 GHz is very low.

Accordingly, as shown in FIG. 10, the quality monitor of the alternative embodiment does not have a line corresponding to the first branch line of the previous embodiment but has the delaying interferometer assembly 92 and prescaler 94, as well as an oscillator 96 between the optical splitter 14 and photoelectric converter 18, FIG. 2. In the alternative embodiment, the components, such as photodiode 48, band-pass filter 60, amplifier 72 and RF intensity detector 80, on the first branch line starting with the photoelectric converter 18 and ending with the detector assembly 24 in the previous embodiment are used on one of the two second branch lines.

The delaying interferometer assembly 92 has a function of producing an interference signal when the phase difference between the wavelengths corresponding to the carrier waves of two light signals to undergo interference is zero and another interference signal produced when the phase difference is equal to $\pi$ to output either one of the produced interference signals. The delaying interferometer assembly 92 includes a 1-bit delay interferometer 98 and a ½-bit delay interferometer 16. The 1-bit delay interferometer 98 is adapted to delay its input signal by a period of one bit to output the produced destructive interference signal 100 to the prescaler 94 including a modulator 102.

The prescaler, or frequency divider, 94 consisting of a frequency divider has a function of asynchronously dividing the frequency of the supplied light signal to thereby down-convert the frequency. The prescaler 94 of the alternative embodiment includes modulators 102 and 104, drivers 106 and 108 for the modulators, and bias tees 110 and 112, which are interconnected as illustrated. Each of the modulators 102 and 104 may include, for example, an electro-absorption modulator (EAM). The modulators 102 and 104 receive light signals 100 and 46 to be modulated and output the optical beat signals 114 and 116, respectively, to the photoelectric converter 18.

Each of the drivers 106 and 108 for the modulators has a function of amplifying the supplied signal to an appropriate amplitude. The drivers 106 and 108 are supplied with a signal 118 by the oscillator 96. The drivers 106 and 108 are adapted to amplify the input signal 118 to output amplified signals 120 and 122 to the bias tees 110 and 112, respectively.

The bias tees 110 and 112 have a function of applying a voltage or sinusoidal signal to RF signals without affecting them. The bias tees 110 and 112 deliver output signals 124 and 126, to which a sinusoidal signal of offset frequency $\Delta f$ is added, to the control terminals of the modulators 102 and 104, respectively. In the alternative embodiment, the offset frequency $\Delta f$ is equal to 250 MHz.

The oscillator 96 functions as an electrical local oscillator. In the alternative embodiment, the local oscillator generates an oscillation frequency of f/4, where f is the frequency of the light signal applied to the quality monitor 10. The oscillator 96 outputs the generated signal 118 to the drivers 106 and 108 for the modulators. Because the frequency f of the light signal is 10 GHz, the oscillation frequency f/4 is equal to 2.5 GHz.

The photodiodes 48 and 50, band-pass filters 60 and 62, amplifiers 72 and 74, and RF intensity detectors 80 and 82 may functionally be similar to their counterparts of the previous embodiment except that the treated frequency band is different.

The arithmetic circuit 26 may functionally be similar to its counterpart of the previous embodiment except that previously prepared, stored data is different.

Next, the operation of the quality monitor 10 of the alternative embodiment will be described. Also in the alternative embodiment, the light signal beam 36 to be monitored is an NRZ light signal of 10 Gbit/s. The signal beam 36 is indicated by frequency f=10 GHz corresponding to a bit rate of 10 Gbit/s.

The light signal beam 36 is supplied to the optical bandpass filter 12, which in turn outputs the band-limited light signal 38 to the optical splitter 14. The input signal to the splitter 14 is split into the three light signal beams 40, 42 and 44. The first signal beam 40 is fed to the 1-bit delay interferometer 98, where the input NRZ-modulated light signal is rendered interfere with a light signal obtained by delaying the input light signal by a period corresponding to about 1 bit. In the alternative embodiment, a destructive interference signal 100 delivered from the destructive output port of the interferometer 98 is employed. The output light signal 100 from the interferometer 98 is modulated by the modulator 102, which in turn outputs a beat signal 114 of 1 GHz.

The output signal 118 from the oscillator 96 is amplified to an appropriate amplitude level by the modulator driver 106 to produce an amplified signal 120. In response to the amplified signal 120, a sinusoidal signal having an offset frequency $\Delta f$=250 MHz obtained from the frequency f/4=2.5 GHz of the signal 118 is applied to the modulator 102. Each of the modulators 102 and 104 is made of an EAM modulator. The modulators 102 and 104 down-convert the frequencies of their input signals. For this purpose, the method disclosed by Kagawa referred to earlier may be applied.

The optical beat signal 114 of 1 GHz output from the modulator 102 is supplied to the photodiode 48, FIG. 4, which in turn converts the optical beat signal 114 into the electric signal 54 output to the band-pass filter 60. The filter 60 extracts the beat signal component of 1 GHz from the input signal 54. The output signal 66 from the filter 60 is amplified by the amplifier 72 in conformity with the detecting capability of the RF intensity detector 80. The amplifier 72 outputs its output signal 76 to the RF intensity detector 80.

The RF intensity detector 80 detects the intensity of the input signal 76 and produces an output signal 86 indicating the detected intensity a. The output signal 86 is fed to the arithmetic circuit 26. It suffices that the photodiode 48, band-pass filter 60, amplifier 72, and RF intensity detector 80 can handle a band of 1 GHz.

The second light signal beam 42 is applied to the ½-bit delay interferometer 16, where the input light signal beam 42 is made interfere with a light signal obtained by delaying the input light signal beam 42 by a period corresponding to about ½ bit. In the instant alternative embodiment, the interferometer 16 employs the output signal 46 from the destructive output port.

The modulator 104 modulates the output light signal 46 from the ½-bit delay interferometer 16 in the same way as the modulator 102. For this modulation, the method Kagawa already described in connection with the modulator 102 may be used. The modulator 104 outputs the beat signal 116 of 1 GHz to the photodiode 50, FIG. 4. The optical beat signal 116 of 1 GHz delivered from the modulator 104 is converted into the electric signal 56 by the photodiode 50. The electric signal 56 from the photodiode 50 is output to the band-pass filter 62, which in turn extracts the beat signal component with frequency of 1 GHz from the supplied electric signal 56. The output signal 68 from the filter 62 is amplified by the amplifier 74 in conformity with the detecting capability of the RF intensity detector 82. The amplifier 74 outputs its output signal 78 to the detector 82, which in turn detects the intensity of the supplied signal 78 and produces the output signal 88 indicating the detected intensity b. The signal 88 is output to the arithmetic circuit 26.

The third light signal beam 44 is processed in the same way as in the previous embodiment. More specifically, the light signal beam 44 is converted into the electric signal 58 by the photodiode 52. The signal 58 is passing the low-pass filter 64, where the high-frequency components of the signal 58 are removed. Thus, the signal is smoothed. The average power intensity of the output signal 70 from the filter 64 is detected by the power detector 84. The output signal 90 from the detector 84 indicating the average intensity c is output to the arithmetic circuit 26.

The arithmetic circuit 26 calculates the ratios a/c and b/c based on the input three intensities a, b, and c indicated by the signals 86, 88, and 90, respectively. The arithmetic circuit 26 determines the values of the wavelength dispersion and optical SNR based on the calculated ratios a/c and b/c or the tendency of change in wavelength dispersion and optical SNR based on the calculated ratios a/c and b/c.

Figure 11:
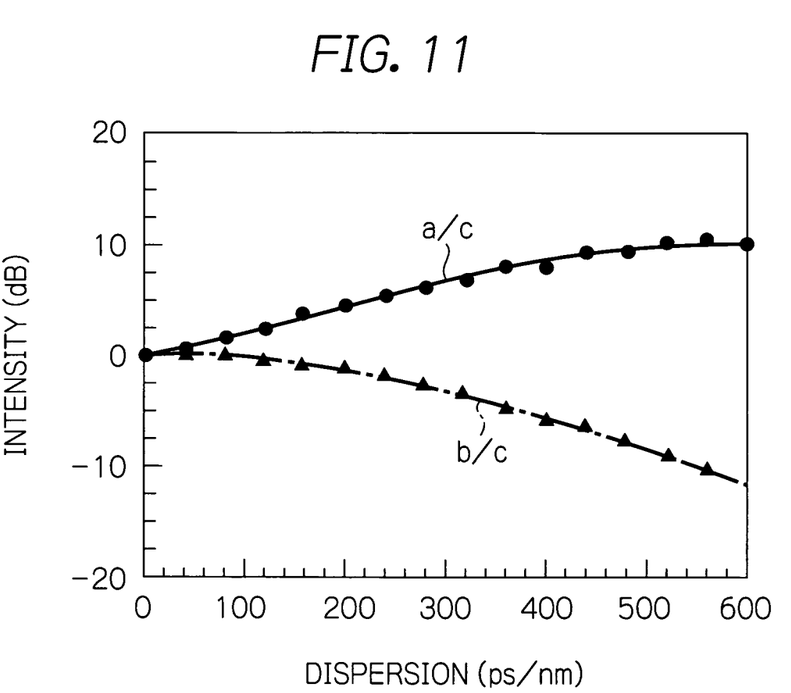
FIG. 11 is a graph, like FIG. 7, in which intensity values calculated by an arithmetic circuit included in the quality monitor partially shown in FIG. 10 are plotted with respect to wavelength dispersion.
Figure 12:
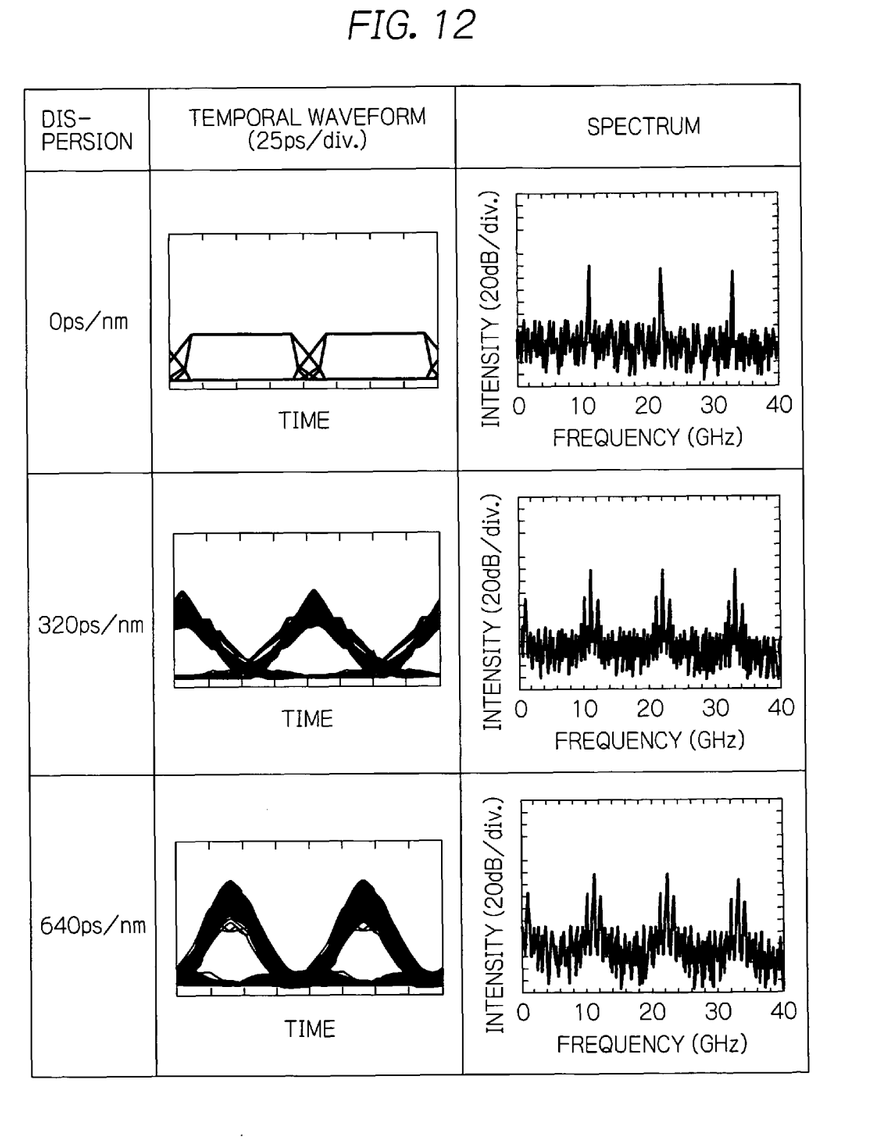
FIG. 12 shows, like FIG. 8, characteristics, such as temporal waveforms and spectra, of electric signals output from the first photodiode at some levels of wavelength dispersion in the quality monitor shown in FIG. 10.

As seen from FIG. 11, the ratios a/c and b/c calculated by the arithmetic circuit 26 are plotted with respect to wavelength dispersion. The light signals, before photoelectrically converted, have respective wavelength dispersion values of 0, 320, and 640 ps/nm. Temporal waveforms and spectra of the electric signal 54 photoelectrically converted by the photodiode 48 on the first branch line from the light signals in the alternative embodiment are shown in FIG. 12. As is obvious from FIG. 12, as the amount of wavelength dispersion increases, the intensity of 1 GHz increases. This corresponds to the fact that as the amount of wavelength dispersion increases, the computed ratio a/c increases.

Figure 13:
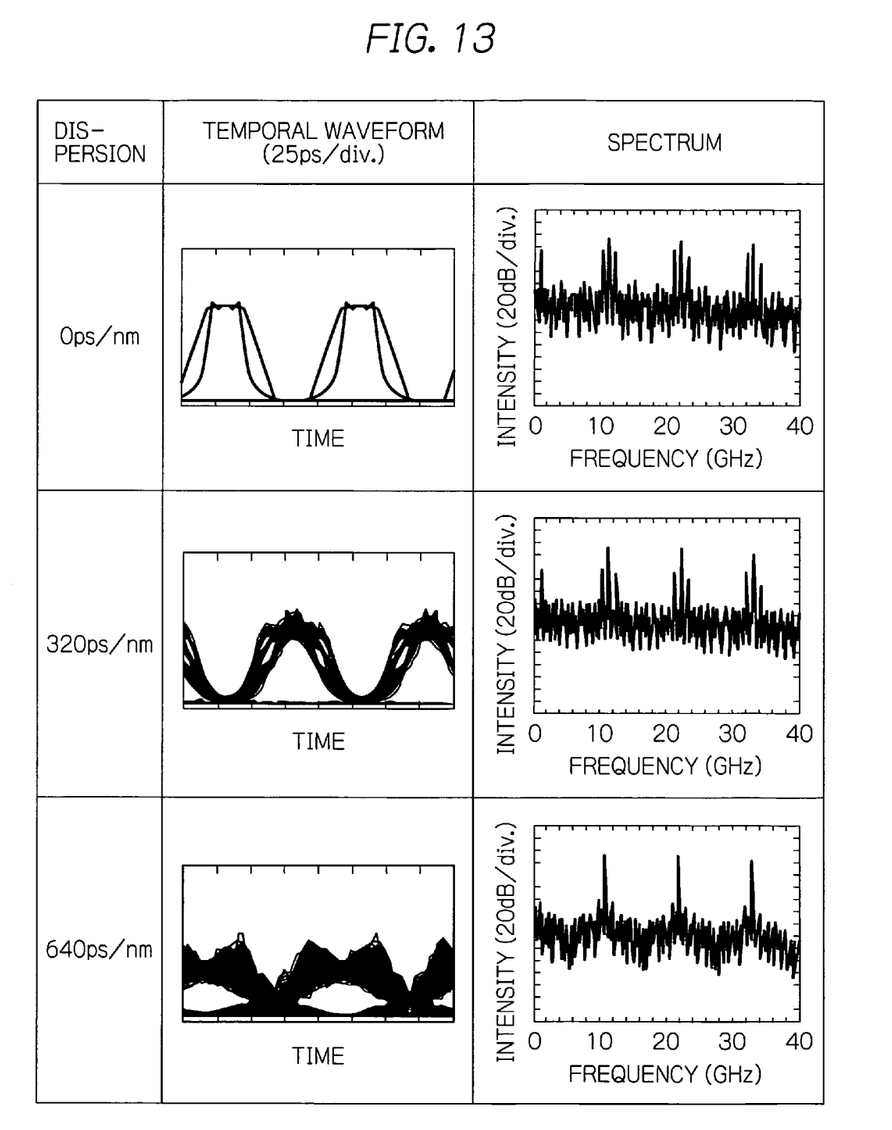
FIG. 13 shows, like FIG. 9, characteristics, such as temporal waveforms and spectra, of electric signals output from the second photodiode at some levels of wavelength dispersion in the quality monitor shown in FIG. 10.

The light signals not yet photoelectrically converted have respective wavelength dispersion values of 0, 320, and 640 ps/nm. Temporal waveforms and spectra of the electric signal 56 photoelectrically converted by the photodiode 50 on the second branch line from the light signals in the alternative embodiment are shown in FIG. 13. As the amount of wavelength dispersion of the second light signal beam 42 increases, the intensity of 1 GHz decreases. This corresponds to the fact that as the amount of wavelength dispersion increases, the computed ratio b/c decreases.

When the optical SNR of a light signal decreases, the signal component of the input light signal decreases. Hence, the computed ratios a/c and b/c become smaller than the computed ratios a/c and b/c indicating the state in which the signal component of the light signal is not yet reduced.

The arithmetic circuit 26 has data stored in advance which describe the contents of the obtained graph shown in FIG. 11 for the sub-ranges of the range of values that the optical SNR can assume. The arithmetic circuit 26 uses the pair of ratios a/c and b/c computed by the arithmetic circuit 26 as a search key to search the stored data to thereby determine the pertinent optical SNR and wavelength dispersion.

The arithmetic circuit 26 is not limited to one performing this specific way of determination. Other methods of determination may also be applied. The arithmetic circuit 26 may be adapted to calculate, at predetermined intervals, the ratios a/c and b/c, compare the pair of obtained ratios a/c and b/c with the pair of ratios a/c and b/c calculated the previous time, determine the tendency of the quality of the optical signal to be inspected, and fix the tendency of change in wavelength dispersion or optical SNR.

In summary, the alternative embodiment makes it possible to evaluate the wavelength dispersion and optical SNR of an NRZ light signal at the same time. In the illustrative embodiment shown in and described with reference to FIG. 2, during the processing starting with the end of photoelectric conversion and ending with detection of signal intensities, parts or components are required which operate in a band of frequencies corresponding to the bit-rate frequency. In the alternative embodiment, however, a modulation circuit is used as the modulation prescaler 94 to down-convert a light signal to be inspected. Therefore, the intensity of the signal of a relatively low frequency is detected. Consequently, parts or components for use in the processing beginning with the end of photoelectric conversion and ending with the detection of the signal intensities can operate in a frequency band lower than the band of frequencies at which the components of the previous embodiment operate. Since the parts operating at lower frequencies are employed, the quality monitor 10 can be implemented more simply and economically. The alternative embodiment can yield more fruitful advantages than the aforementioned prior art solution.

If the modulation circuit 94 is used without providing the 1-bit delay interferometer 98 on the first branch line, signals converted into lower frequencies would not be obtained because line spectral intensities of 10 GHz are lower than signal intensity levels as understood from FIG. 8 showing the spectrum of wavelength dispersion of 0 ps/nm. For that reason, the alternative embodiment includes the 1-bit delay interferometer 98 on sub-first branch line of the second branch line, permitting use of parts operating at low frequencies.

Two illustrative embodiments of the invention described above are adapted to process light signals of 10 Gbit/s. It is obvious that the principle of the invention can be applied to signals of other bit rates. The alternative embodiment is adapted to handle the offset frequency (df) is 250 MHz. Other offset frequencies can also be used.

In the aforementioned two embodiments, the ratios a/c and b/c computed from the values a, b, and c of the outputs from the signal branch lines are used in evaluating the quality monitor 10. Other sort of calculated values may also be used. For example, calculated values $a^2/c$ and $b^2/c$, and a−c, and b−c may be used. Furthermore, calculated values (a−c)/c and (b−c)/c may be used.

The first embodiment shown in and described with reference to FIG. 2 includes the ½-bit delay interferometer 16. The alternative embodiment includes the ½-bit delay interferometer 16 and the 1-bit delay interferometer 98. As a delaying interferometer, a system appropriately using a ⅗-bit delay interferometer, a 2-bit delay interferometer, and a ¼-bit delay interferometer may be provided.

In the above illustrative embodiments, the input light signal is split into three signal beams. One of the three signal beams is used to find reference information c. The remaining two signal beams are used to obtain information in which wavelength dispersion and optical SNR are reflected. Alternatively, three signal beams may be used to obtain the information in which the wavelength dispersion and optical SNR are reflected. For example, the signal beam of the first embodiment for calculating the value a, the signal beam of the alternative embodiment for calculating the value a, and the signal beam of the alternative embodiment for calculating the value b as the three signal beams may be used to derive the information in which the wavelength dispersion and optical SNR are reflected. The wavelength dispersion and optical SNR may be evaluated from a set of calculated ratios a/c with the first embodiment and the calculated ratios a/c and b/c with the alternative embodiment using the values determined from the three signal beams.

Furthermore, in connection with the above embodiments, examples are described in which the values of wavelength dispersion and optical SNR are determined or the tendency of change in wavelength dispersion and optical SNR is determined after the arithmetic circuit 26 obtains values computationally. The system may be adapted to successively store calculated values in a memory. That is, analysis of the calculated values may be performed later or by another circuitry.

The entire disclosure of Japanese patent application No. 2009-222609 filed on Sep. 28, 2009, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A quality monitoring apparatus, comprising:
    an optical splitter for splitting a binary intensity-modulated light signal to be monitored into three or more light signal beams;
    a delaying interferometer for making one of the light signal beams interfere with a light signal obtained by delaying the one light signal beam by a predetermined delay time to produce constructive and destructive interference signals to output one of the constructive and destructive interference signals;
    a photoelectric converter for converting light signal beams directly supplied thereto from said optical splitter and a light signal emerging from said delaying interferometer into electric signals;
    a filter bank including band-pass filters for passing a frequency component of an electric signal fed from said photoelectric converter, the frequency component corresponding to a bit rate of the light signal to be monitored, and a smoothing filter for smoothing an electric signal fed from said photoelectric converter;
    an amplifier for amplifying outputs from said band-pass filters to a level enabling a subsequent detection;
    detector circuitry for detecting intensities of electric signals from said amplifier and an intensity of a smoothed electric signal; and
    an arithmetic circuit for setting the intensity of the detected, smoothed electric signal as a reference, and calculating the intensities of the detected, amplified signals relative to the reference to determine wavelength dispersion and optical SNR (signal-to-noise ratio) of the light signal to be monitored or a tendency of change in the wavelength dispersion and optical SNR based on the calculated relative intensities,
    said detector circuitry comprising:
    a first signal intensity detector on a first branch line over which the light signal beam from said splitter passes for detecting the intensity of the band-pass filtered, amplified electric signal originated from the light signal beam;
    a second signal intensity detector on a second branch line over which the light signal beam from said splitter passes for detecting the intensity of the electric signal band-pass filtered and amplified after emerging from said delaying interferometer; and
    a power intensity detector on a third branch line over which the light signal beam from said splitter passes for detecting the intensity of the smoothed electric signal derived from the light signal.

2. The apparatus in accordance with claim 1, wherein the predetermined delay time of said delaying interferometer is selected to be a period of half bit.

3. A quality monitoring apparatus comprising:
an optical splitter for splitting a binary intensity-modulated light signal to be monitored into three or more light signal beams;
a delaying interferometer assembly for making plural ones of the light signal beams interfere with respective light signals obtained by delaying the plural light signal beams by respective predetermined delay times to produce constructive and destructive interference signals to output one of the constructive and destructive interference signals for each of the plural light signal beams;
a prescaler operative in response to the light signal beams for down-converting frequency bands of the respective interference signals derived from said delaying interferometer assembly to produce beat signals;
an oscillator for generating a signal of a predetermined frequency to said prescaler;
a photoelectric converter for converting a light signal directly supplied from said optical splitter and the beat signals emerging from said prescaler into electric signals;
a filter bank including band-pass filters for passing a frequency component of the electric signals from said photoelectric converter, the frequency component corresponding to a bit rate of the light signal to be monitored, and a smoothing filter for smoothing another of the electric signals from said photoelectric converter;
an amplifier for amplifying outputs from said band-pass filters to a level enabling a subsequent detection;
detector circuitry for detecting intensities of electric signals from said amplifier and an intensity of a smoothed electric signal; and
an arithmetic circuit for setting the intensity of the detected, smoothed electric signal as a reference, and calculating the intensities of each of detected, amplified signals relative to the reference to determine wavelength dispersion and optical SNR (signal-to-noise ratio) of the light signal to be monitored or a tendency of change in the wavelength dispersion and optical SNR based on the calculated relative intensities;
said detector circuitry comprising:

a first signal intensity detector provided on a first branch line over which the light signal beam from said splitter passes and responsive to first one of the interference signals from said delaying interferometer assembly for detecting the intensity of the band-pass filtered, amplified electric signal produced from the beat signal;
a second signal intensity detector provided on a second branch line over which the light signal beam from said splitter passes and responsive to second one of the interference signals from said delaying interferometer assembly for detecting the intensity of the band-pass filtered, amplified electric signal produced from the beat signal; and
a power intensity detector on a third branch line over which the light signal beam from said splitter passes for detecting the intensity of the smoothed electric signal derived from the light signal.

4. The apparatus in accordance with claim 3, wherein said delaying interferometer assembly includes a first delaying interferometer on the first branch line and a second delaying interferometer on the second branch line,
said first delaying interferometer having the predetermined delay time selected to be a period of one bit, said second delaying interferometer having the predetermined delay time selected to be a period of half bit.

5. The apparatus in accordance with claim 4, wherein said prescaler comprises:
drivers for respectively amplifying the signals of the frequency from said oscillator in response to the input interference signals;
bias tees for respectively generating offset signals of offset frequencies added to the interference signals delivered from the delaying interferometers and having frequencies corresponding to the bit rate;
optical modulators for modulating the input interference signals with the added offset signals to convert the input interference signals into signals of lower frequencies.

6. The apparatus in accordance with claim 5, wherein each of said optical modulators comprises an electro-absorption modulator.

7. The apparatus in accordance with claim 4, wherein the predetermined frequency of the signal generated by said oscillator is one fourth (¼) of the frequency possessed by the light signal to be monitored.

* * * * *